July 21, 1942. C. H. TAYLOR Re. 22,141

SUCTION CLEANER

Original Filed Sept. 28, 1936 2 Sheets-Sheet 1

INVENTOR

Charles H. Taylor

BY

Harry S. Dwarss

ATTORNEY

July 21, 1942. C. H. TAYLOR Re. 22,141

SUCTION CLEANER

Original Filed Sept. 28, 1936 2 Sheets-Sheet 2

INVENTOR

*Charles H. Taylor*

BY

*Harry S. Dunarse*

ATTORNEY

Reissued July 21, 1942 Re. 22,141

UNITED STATES PATENT OFFICE 22,141

SUCTION CLEANER

Charles H. Taylor, Springfield, Mass., assignor to The Hoover Company, North Canton, Ohio, a corporation of Ohio Original No. 2,178,006, dated October 31, 1939, Serial No. 102,899, September 28, 1936. Application for reissue September 8, 1941, Serial No. 410,120

17 Claims. (Cl. 15—16)

This invention relates to improvements in suction cleaners and more particularly to an improved nozzle height adjustment mechanism for regulating the height of the nozzle of a suction cleaner above the surface of the carpet to be cleaned.

Without entering into a full discussion of the subject of nozzle height adjustment, it may be stated that the performance of the usual suction cleaner will vary materially on different grades of carpet and chiefly because of the variation in the thickness and texture of the pile. Heretofore, it has been common practice to regulate the nozzle height by a manual adjusting device, whereby the turning of a knob in one direction or the other raises or lowers, as the case may be, the front or rear supporting wheels, thereby tilting the body of the cleaner to produce the desired nozzle height.

This same adjusting operation may be accomplished semi-automatically by mechanism which functions by merely operating a lever, whereupon the nozzle is raised to the proper height for a particular floor covering. A semi-automatic nozzle height adjusting mechanism functioning in the manner just stated, is the subject matter of an earlier application filed by me on August 15, 1936, and bearing Serial Number 96,222.

The object of the present invention is to improve somewhat upon the mechanism of the earlier disclosure by utilizing the cleaner handle as an operating lever, thus making it possible to make the adjustment by moving the handle through a predetermined arc or to and from a certain position, and preferably one not occupied by the handle during the normal operation of the cleaner, as for example, its extreme upward and forward position.

The preferred embodiment of the invention is disclosed in the accompanying drawings in which.

Figure 1:
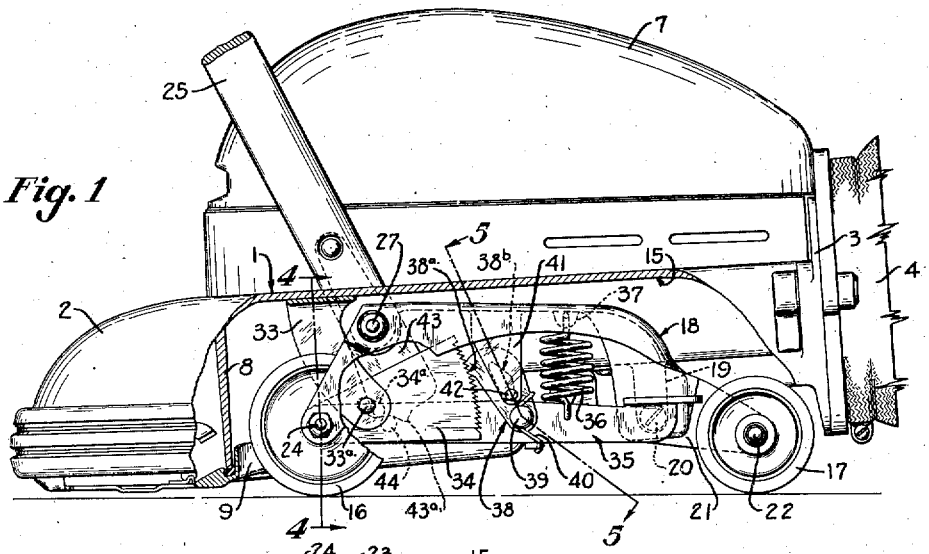
Figure 1 is a view in side elevation of a suction cleaner with a portion of the side wall broken away to show the nozzle adjusting mechanism of the handle advanced to its forwardmost position preparatory to operating the nozzle adjusting mechanism.

Referring to the cleaner in its general aspects, the same comprises a main casing 1, having a nozzle portion 2, extending transversely of its forward end and having the form of an elongated chamber with a downwardly facing opening. The casing extends rearwardly from the nozzle portion, gradually converging to a rearwardly opening flanged outlet connection 3 to which is attached a dirt receptacle in the form of a fabric bag 4. Centrally of the casing 1 is a circular fan chamber 5, visible from the underside thereof, and enclosing a fan 6, having direct driving connection with a motor (not shown) enclosed within a dome-like cover or hood 7 surmounting the casing 1. The inlet to the fan chamber has the form of a circular opening or eye 5a, located centrally of the bottom wall of the fan chamber and concentric with the vertical axis of the fan and its driving motor. Surrounding the rear half of the fan eye 5a and extending forwardly towards the nozzle portion 2, with a slight outward flare is a depending wall 8 curving abruptly through a right angle as it approaches the nozzle and forming the rear wall thereof at its outer ends. This depending wall forms the sides of a passage extending forwardly and communicating with the interior of the nozzle 2, said passage being closed at its bottom by a plate 9, having an upwardly facing marginal groove bearing against the bottom edge of the wall 8 and suitably lined with a resilient material to form an air tight seal. This bottom plate 9 is shaped to conform with the outline of the wall 8, and preferably comprises as an integral part thereof, the bottom section of the nozzle portion 2, consisting of a pair of parallel lips 9a, 9a, connected at their ends by means of a pair of end lips 9b, 9b. These lips form the relatively wide suction mouth leading to the nozzle chamber immediately above and in which is located a rotating agitator 10, consisting of a cylindric shell having brush elements 10a, 10a, arranged lengthwise thereof and helically arranged beater elements 10b, 10b. The bottom plate 9 is removable to uncover the nozzle chamber and the passage leading rearwardly therefrom, being detachably held in place by a suitable latch member 11 at the extreme rear end of the bottom plate. Also enclosed within the passage from the nozzle chamber to the fan chamber is a drive belt 12 which engages a pulley 13 carried at the lower end of the fan 6 and, extending forwardly therefrom, engages a pulley groove 10c midway between the ends of the agitator 10 and immediately above a guard member 14, extending transversely of the suction mouth, as clearly shown in Figure 2.

Again referring to the main casing 1, with its centrally disposed circular fan chamber 5, it will be noted that along the edges of the casing and extending rearwardly from the ends of the nozzle 2 are depending curvilinear walls 1a, 1a, and between these depending marginal walls 1a, 1a, and the outer side walls of the fan chamber 5, are cavities or hollow spaces 15 which have a depth substantially equal to the height of the casing 1 itself. It is within these cavities enclosed by the marginal side walls 1a, 1a, of the casing, that is located the wheeled support for the casing as well as the nozzle adjusting mechanism associated therewith.

The cleaner casing 1 is supported upon a wheeled frame or carriage on which are mounted a pair of front carrier wheels 16, 16 and a pair of rear carriers 17, 17. The frame of the carriage is a U-shaped casting 18, pivotally connected to the main casing 1, centrally of its own base portion by means of a bearing bracket 19 depending from the underside of the fan chamber 5 which carries a transverse pivot pin 20. Extending rearwardly from the pivotal bearing of the frame 18 is a bracket 21 which supports an axle 22 extending transversely thereof and carrying at its outer ends the rear caster wheels 17, 17.

From the point of pivotal connection of the frame member 18 with the underside of the casing 1, the lateral extremities of the former curve forwardly within the cavities 15 between the side wall of the fan chamber and the outer marginal walls 1a, 1a, of casing 1. These extremities terminate just rearwardly of the nozzle portion 2, in the form of fork members 23, 23 in which the front wheels 16, 16 are supported, the same being journalled on bearing shafts 24, 24, at the ends of said fork members.

Figure 4:
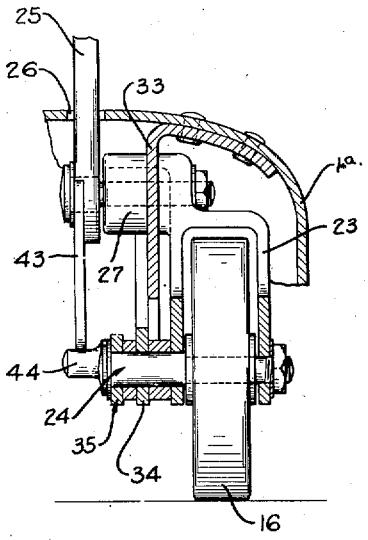
Fig. 4 is a detailed view in vertical section taken on line 4—4 of Figure 1.

Carried by the chassis 18 just rearwardly of and above the front wheel supporting members 23, 23 is an inverted U-shaped bail member 25 which forms the lower extremity of the handle of the cleaner. Bail 25 straddles the dome-like cover 7 and projects at each side thereof through longitudinal slots 26, 26 in the top wall of the casing 1 to have its ends pivotally connected to bearing bosses 27, 27 integral with the forward extremities of the chassis frame 18 and projecting laterally and inwardly therefrom (Figure 4). Thus the cleaner handle is carried pivotally by the wheeled chassis and quite independently of the casing 1.

Figure 2:
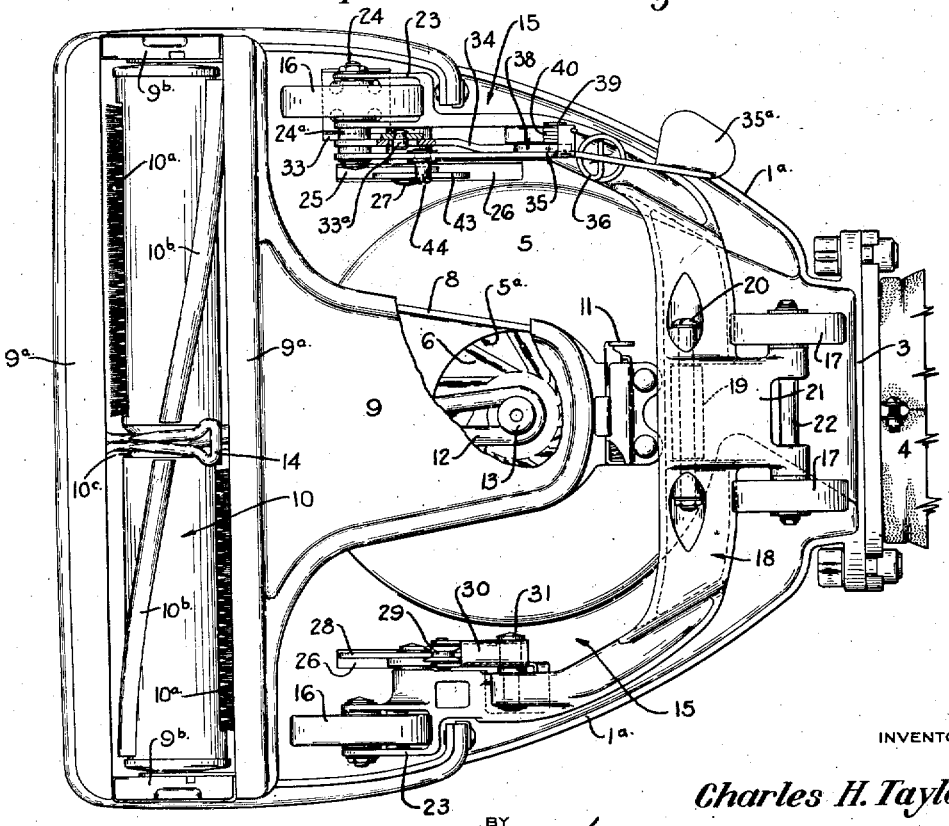
Figure 2 is a bottom plan view of the cleaner casing.

Associated with the handle bail 25 and located adjacent one of its pivotal connections with the corresponding end of the U-shaped frame 18 and shown near the bottom of Figure 2, is a handle position control device which serves to restrain the handle from free swinging movement, to hold it yieldingly in its extreme positions, and to define its intermediate position or working range. This position control device is already in common use, therefore need not be fully described herein, although the essential parts thereof may be identified and located. Thus, a cam sector 28 is mounted on one lower extremity of the handle bail 25 to move therewith and, projecting therebeyond, presents a downwardly facing arcuate edge on which are formed three notches. The endmost notches correspond to the extreme positions of the handle and the intermediate notch being somewhat elongated, corresponds to the intermediate working range. Contacting the notched edge of the sector 28 is a cam roller 29 carried at the end of a bell-crank lever 30 pivotally supported intermediate its ends on a pivot pin 31 carried by the carriage frame 18 with its bearing portion projecting laterally inward from the end thereof. The bell-crank lever is acted upon by a compression spring (not shown) suitably supported upon the carriage frame 18 and serves to hold the cam roller in yielding contact with the handle position control sector 28 with sufficient force to prevent unintentional pivotal movement of the cleaner handle with the roller positioned within the aforementioned notches.

The automatic nozzle height adjusting mechanism is interposed functionally between the frame 18 and the casing 1. Physically it is positioned rearwardly of the nozzle 2 and adjacent one extremity of the frame as is best illustrated in Figure 2. A bracket 33 consisting of a flat arm projects downwardly from the underside of casing 1 in the rear of nozzle 2 and with a slight rearward curvature, its lower end terminating just inside of the wheel supporting fork 23 and just rearwardly of the journal pin 24. However, there is no direct connection between the bracket 33 and the chassis frame 18, but rather an indirect connection through a ratchet sector 34 having pivotal mounting on an extension 24a of the bearing pin 24 projecting inwardly beyond the wheel fork 23 as clearly shown in Figure 2. The ratchet sector 34 has the form of an elongated triangular shaped plate with its apex pivoted on the bearing extension 24a and extending rearwardly therefrom diverges to form an arcuate toothed sector along its rear edge. This ratchet sector swings in a vertical plane and is connected by a pin and slot connection at a point spaced from its pivotal support 24a and somewhat near its apex, with the lower end of the bracket 33, the latter carrying a laterally projecting pin 33a which engages a short slot 34a formed in the ratchet sector 34. With this arrangement it is apparent that the ratchet sector forms connecting link or toggle between the casing and the chassis and that by imparting a rocking movement to the ratchet sector about its pivotal support a reduced rocking or tilting movement of the casing on its chassis will be produced.

Journalled upon the same bearing shaft 24 with the ratchet sector 34 is a lever 35, extending rearwardly just inside the ratchet sector and in a substantially horizontal direction. Lever 35 is provided at its rear end with a foot pedal 35a projecting laterally from beneath the lower edge of the marginal wall 1a of the casing 1 into a position in which it can be forced downwardly by a force exerted by the operator's foot. This lever 35 is normally held in its uppermost position and against downward movement by a relatively stiff coil spring 36 which is attached at its lower end to the lever just forwardly of its pedal extremity 35a and at its upper end to a lug 37 depending from the underside of the chassis frame 18 immediately above.

A spring-pressed pawl 38 is pivotally mounted by a pin 39 on the foot operated lever 35 substantially intermediate its ends and in the plane of the ratchet sector 34. Pawl 38 extends in a general upward and forward direction and is provided at its forward upper end with several teeth 38a adapted to engage the teeth of the ratchet sector 34. A torsion spring 40, coiled around the pawl pivot pin 39 with one end hooked over a projection on the lower edge of the operating lever 35 and the other end around the back edge of the pawl 38, as is clearly shown in Figure 1, acts to yieldingly hold the pawl in engagement with the ratchet sector 34.

Figure 3:
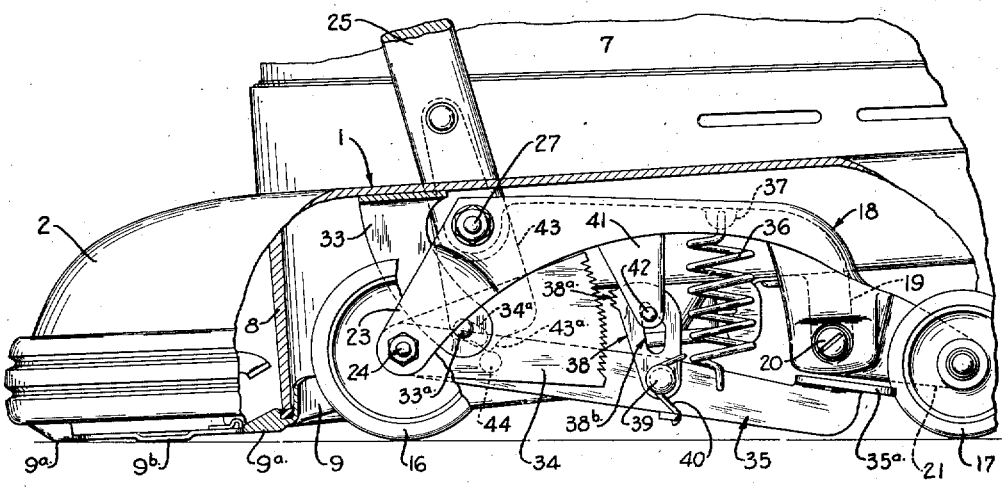
Figure 3 is Figure 1 repeated, but with the handle pivoted rearwardly slightly from its position in Figure 1 and nozzle height adjusting mechanism in the position in which the nozzle is resting in contact with the carpet surface.
Figure 5:
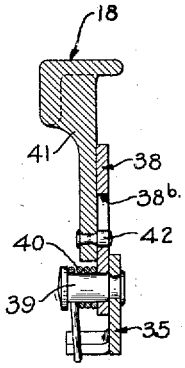
Figure 5 is a detailed view taken on line 5—5 of Figure 1.

Referring to Figures 1 and 5, there will be seen immediately adjacent and above the pawl 38, an arm 41 depending from the underside of the chassis frame 18. Arm 41 carries a laterally projecting guide pin 42 which engages a somewhat triangular shaped slot 38b located in the central portion of the pawl 38, the pin at all times riding against the shaped rear side of the slot under the action of the pawl pivoting spring 40. This pin and slot connection serves to impart a cam action to the pawl, throwing it into and out of engagement with the ratchet sector 34. More particularly the cam action controls the pawl so that it disengages the ratchet sector at the beginning of the downward stroke of the lever 35 and holds it disengaged until the lever is released, whereupon the pawl is quickly thrown into re-engagement with the sector. It can be observed from the contour of the rear wall of slot 38b and the relation thereto of the point of pivotal support 39 of the pawl that the latter will have a particular movement. In the downward movement the pawl will move from the sector teeth, from the position illustrated in Figure 1 to that illustrated in Figure 3. In the upward movement the pawl moves first into contact with the sector teeth and then upwardly, carrying the sector with it, until the pin 39 contacts the lower end of the slot 38b.

The operation of the nozzle adjusting mechanism will be understood from the following discussion:

Let it be assumed that the cleaner has been wheeled onto a carpet preparatory to operation thereon and that the nozzle is elevated above the carpet surface as shown in Figure 1. To obtain the correct setting the operator merely depresses the lever 35 to its fullest extent and upon releasing it the nozzle of the cleaner is automatically adjusted to the proper height regardless of previous setting.

The semi-automatic action will now be described in detail: When the lever 35 is depressed from the substantially horizontal position shown in Figure 1 to the position shown in Figure 3, the first step is the disengaging of the pawl 38 from the ratchet sector 34, by the cam action of the stationary pin 42 in the slot 38b of the pawl. Now, immediately upon the release of the ratchet sector 34 by the pawl, the entire forward end of the cleaner casing 1 is free to tilt downwardly about its pivotal axis 20 until the suction mouth of the nozzle rests flush upon the carpet surface. This result follows for it has been the sector 34 which, through its pin and slot relationship with the bracket 33, has supported the front or nozzle end of the cleaner. The ratchet sector 34 now being released the casing tilts freely about its pivot on the chassis 18 and, the greater mass of the cleaner being forwardly of the pivotal axis, the nozzle simply drops into contact with the carpet surface.

But an important point to be noted here is that the bottom surface of the nozzle, being made up of wide lips surrounding the suction mouth, affords a relatively large contact surface and of such area that when the nozzle drops into contact with the surface of a carpet or rug there is no appreciable penetration of the pile. On the other hand, the cleaner wheels, having only a small part of the surface contacting area of the nozzle, may sink into the covering even to the full depth of the pile. Thus the base plane from which the later adjustment takes place is established by the contact of the nozzle with the carpet pile and is above that established by the wheels. Regardless of the character of the carpet the base plane is always the plane of contact of the nozzle with the upstanding carpet fibers and is fixed regardless of the depth of wheel penetration.

The relative movement of the chassis 18 and the cleaner casing 1 resulting from the initial movement of the lever 35, is reflected in a slightly greater or less angular displacement of the ratchet sector 34, it having been released by the pawl 38. This angular downward pivotal movement of the sector may equal an arc of one or more of the ratchet teeth as the downward movement of the nozzle portion of the casing is transmitted thereto through the bracket 33, and more particularly, through the pin and slot connection 33a, 34a. But with the release of the lever 35, the spring 36 acts to retract it to its normal substantially horizontal position. The upward movement of the lever first throws the pawl 38 into engagement with the ratchet sector 34 and then swings that member upwardly in a counter-clockwise direction which movement continues until the pin 42 contacts the bottom of the pawl slot 38b. This upward pivotal movement of the sector 34, through the latter's connection with bracket 33, produces the lifting of the casing to elevate the nozzle to its proper height.

And finally, this upward lifting or elevation of the nozzle is previously determined for a particular type and style of cleaner and is constant regardless of varying surface conditions. For example, if $\frac{5}{32}$ of an inch is predetermined as the proper nozzle height setting for a particular cleaner the adjusting mechanism is designed to raise the nozzle this distance above the surface of the carpet pile regardless of the type or character of the carpet.

Thus, it is seen that the adjustment is accomplished by merely pressing downwardly on the foot operated pedal or lever. There will now be described the interconnection between the handle bail 25 and the operating lever 35 whereby the same adjustment can be accomplished by merely shifting the handle through a predetermined arc of movement.

Referring to Figures 1 and 4 a bladelike cam member 43 forms an extension of the end of the handle bail projecting downwardly beyond its bearing 27 on the chassis 18 and adjacent the nozzle height adjusting mechanism. As shown in side elevation in Figure 1 this cam terminates in rounded corners and a V-shaped cam projection 43a located substantially centrally of its bottom edge.

Carried by the foot operated lever 35 and projecting laterally therefrom at a short distance from its pivoted end, is a pin 44 adapted to have contact with the lower edge of the cam 43. As shown in Figure 1, the handle bail 25, of which the main portion of the handle may be considered as an extension, is adapted to assume a general vertical position which more definitely is at an angle slightly beyond and forwardly of the vertical. This position is one into which the handle may be moved when the cleaner is not in operation and is termed "storage position," the handle being held therein by the handle position control device heretofore described. In this position of the handle it will be noted that the contact pin 44 carried by the foot lever 35 bears against the lower edge of the cam 43 just ahead of the pointed cam projection 43a. Obviously then, if the handle is swung in a rearward direction into the position shown in Figure 3, the cam projection 43a will pass over the pin 44 and in so doing will depress it and the operating lever 35 into the same position that the latter would occupy when depressed by the pressure of the operator's foot. Thus it is seen that the nozzle adjusting mechanism will respond to the depression of the lever 35 by foot operation in the manner previously described or to the swinging the handle so as to carry the cam projection 43a over and beyond the contact pin 44. Manifestly, the foot pedal 35a might readily be removed entirely from the lever 35 so that it becomes a cam follower actuated only by the swinging movement of the handle. By retaining the foot pedal, however, it is possible to adjust the nozzle height either by foot or by hand as the user may find more convenient.

Having thus set forth a preferred embodiment of my invention,

I claim:

1. In a suction cleaner having a body provided with a nozzle, a wheeled support for said body permitting a limited tilting movement thereof, a handle pivotally mounted on said support, a link connecting said support with said body and provided with a ratchet sector, a spring-pressed pawl normally engaging said ratchet sector, a lever carrying said pawl and having operative connection with said handle whereby the swinging movement thereof through a predetermined arc in one direction actuates said pawl to release said ratchet sector, permitting said nozzle to drop into contact with the surface of the floor covering to be cleaned and in the opposite direction to effect the re-engagement of said ratchet sector by said pawl and the elevation of said nozzle to a predetermined height above the floor surface.

2. In a suction cleaner having a body provided with a nozzle and a wheeled support connected with said body for relative vertical adjustment, a handle pivotally mounted on said support to swing relatively to said body, a link connecting said body with said support and shiftable to raise and lower said nozzle means normally holding said link against shifting movement including a pawl and ratchet device, a lever pivotally mounted on said support and having operative connection with said pawl and ratchet device and with said handle whereby the swinging of said handle through a predetermined arc of movement successively actuates said pawl and ratchet device to release said link and effect the dropping of said nozzle into contact with the floor surface and to re-engage said link and actuate the same to raise said nozzle to a predetermined height above said floor surface.

3. In a suction cleaner having a body provided with a nozzle, a wheeled support connected with said body for relative vertical adjustment, a handle pivotally mounted on said support to swing relatively to said body, an adjustable link connecting said body with said support and shiftable to raise and lower said nozzle, means normally holding said link against shifting movement including a spring-pressed cam-actuated pawl adapted to engage ratchet teeth on said link, a spring-actuated lever pivotally mounted on said support adjacent said link and carrying said powl, said lever having operative connection with said handle whereby the swinging of said handle through a predetermined arc of movement successively disengages said pawl from said ratchet teeth to permit said nozzle to drop into contact with the floor surface and re-engages said pawl with said ratchet teeth to raise said nozzle to a predetermined height above said floor surface.

4. In a suction cleaner having a casing provided with a nozzle, and a wheeled support having pivotal connection with said casing, a handle pivotally mounted on said support to swing relative to said casing, an adjustable link connecting said wheel support and casing and operative to raise and lower the nozzle relative to the floor, and a spring-pressed cam actuated member mounted on said support and normally engaging said link to hold the same in a given position of nozzle height adjustment and operatively connected with said handle successively to disengage said link to effect the lowering of said nozzle into contact with the carpet surface and to re-engage said link to elevate said nozzle to a predetermined height above said carpet surface in the swinging movement of said handle through a predetermined arc.

5. In a suction cleaner having a casing provided with a nozzle and a wheeled support having pivotal connection with said casing, a handle pivotally mounted on said support, and means for adjusting said casing relative to said support to vary the height of the nozzle above the carpet surface, comprising a ratchet sector adjustably connecting said wheeled support with said casing and adapted to swing in opposite directions to raise and lower the nozzle relative to the carpet surface, a lever pivotally mounted on said support adjacent said ratchet sector, and a spring-pressed cam-actuated pawl carried by said lever and normally engaging said ratchet sector to hold said nozzle in a given position of adjustment, said lever being operatively connected with said handle whereby said ratchet sector is released by said pawl to effect the lowering of said nozzle into contact with the carpet surface, thence to elevate said nozzle above said carpet surface in the swinging movement of said handle through a predetermined arc.

6. In a suction cleaner having a casing provided with a nozzle and a wheeled support having pivotal connection therewith and means for adjusting the height of said nozzle above the surface to be cleaned comprising an adjustable link connectiong said support with said casing independently of said pivotal connection and having a toothed sector formed thereon, a handle pivotally mounted on said support, a lever also pivotally mounted on said support and operatively connected with said handle, a spring pressed cam actuated pawl carried by said lever and normally having engagement with said sector, said pawl acting to disengage said sector in the swinging movement of said handle in one direction to permit said nozzle to be lowered into contact with the carpet surface and to re-engage said sector to effect the raising of said nozzle a predetermined distance above said surface during a subsequent movement of said handle.

7. In a suction cleaner having a casing provided with a nozzle and a wheeled support having pivotal connection therewith, a handle pivotally mounted on said support, and nozzle height adjusting means comprising adjustable link connecting said casing and said support independently of their pivotal connection and having a toothed sector, a lever pivotally mounted on said support adjacent said link, a spring-pressed cam-actuated pawl pivoted on said lever and normally engaging said sector to hold said link against movement, and a cam member carried by said handle and adapted to impart a cam action to said lever whereby said ratchet sector is successively disengaged by said pawl to permit said nozzle to drop into contact with the carpet surface and to be re-engaged by said pawl to effect the raising of said nozzle to a predetermined height above the carpet surface during a predetermined swinging movement of said handle.

8. In a suction cleaner having a casing provided with a nozzle portion and a wheeled support pivotally conected to the underside of said casing, a handle pivotally mounted on said support independently of said casing, and means for adjusting said casing relative to said wheeled support to vary the height of said nozzle above the surface of the carpet to be cleaned, comprising pawl and ratchet mechanism adjustably connecting said support with said casing and including a lever shiftable in one direction to disengage said pawl and ratchet to permit said nozzle to drop into contact with the carpet surface and in the opposite direction to reengage said pawl and ratchet mechanism to raise said nozzle to a predetermined height above said carpet surface, and means operatively connecting said lever with said handle.

9. In a suction cleaner having a casing provided with a nozzle portion, a wheeled support pivotally connected to the underside of said casing, a handle pivotally mounted on said support independently of said casing and means for adjusting said casing relative to said wheeled support to vary the height of said nozzle above the surface of the carpet to be cleaned, comprising pawl and ratchet mechanism adjustably connecting said support with said casing and including a spring-pressed lever shiftable in one direction by contact with a cam carried by said handle to disengage said pawl and ratchet mechanism and allow said nozzle to drop into contact with the carpet surface and in the opposite direction when released by said cam to reengage said pawl and ratchet mechanism and elevate said nozzle to a predetermined height above said carpet surface.

10. In a suction cleaner having a casing provided with a nozzle portion and a wheeled support including a frame pivotally connected to the underside of said casing and having wheels journaled thereon, a handle pivotally mounted on said frame, and means for adjusting said casing relative to said wheeled support to vary the height of said nozzle above the surface of the carpet to be cleaned, comprising pawl and ratchet mechanism adjustably connecting said casing and said frame remote from its pivotal connection with said casing, and including a spring pressed lever for actuating said pawl and ratchet mechanism, said handle and lever having coacting cam members for shifting said lever in a direction to effect the dropping of said nozzle into contact with the carpet surface in the disengagement of said pawl and ratchet mechanism and with the movement of said handle in one direction, and to release said lever to effect reengagement of said pawl and ratchet mechanism and the elevation of said nozzle to a predetermined height above said carpet surface in the movement of the handle in another direction.

11. In a suction cleaner having a casing provided with a nozzle portion and a wheeled support for said casing including a supporting frame pivotally connected to the underside of said casing and having wheels journaled thereon, a handle pivotally mounted on said supporting frame, and means for adjusting said casing relative to said wheeled support to vary the height of said nozzle above the surface of the carpet to be cleaned, comprising a link connecting said casing with said supporting frame remote from its pivotal connection therewith and provided with a toothed sector, a lever pivotally mounted on said wheeled support, a spring pressed pawl mounted on said lever and normally adapted to have toothed engagement with said sector, means acting to shift said pawl to release said sector during the movement of said lever in a direction to lower said nozzle into contact with the carpet surface and to re-engage said sector at the commencement of the return movement of the lever to effect the elevation of said nozzle to a predetermined height above said carpet surface, tension means acting on said lever to impart the return movement thereto, and a cam carried by said handle and adapted to engage a cam member on said lever for actuating the same.

12. In a suction cleaner, a body including a nozzle, supporting wheels, a pivoted handle to propel said body on a supporting surface, adjustable means interconnecting said body and said wheels to support said nozzle at various heights over a surface covering undergoing cleaning and including means operated by the pivotal movement of said handle outside its normal working range to release said adjustable means in order that said body may fall into nozzle contacting relationship with a supporting surface, and means to raise said nozzle to an operative position above said surface upon the return of said handle to its working range.

13. A suction cleaner having a body including a nozzle having surface contacting lips adapted to support the nozzle upon the top of a surface covering without appreciable penetration, supporting wheels adjacent said nozzle adapted to support said nozzle, means to disconnect said nozzle from supporting relationship with said wheels, means to connect said nozzle to said wheels and to raise said nozzle a predetermined definite distance upon the connection of said nozzle to said wheels in supporting relationship, and handle operated means to operate said means to connect and disconnect.

14. In a suction cleaner, a nozzle having surface contacting lips of an area sufficient to support the nozzle upon a surface covering with substantially no sink, means to support said nozzle above and for movement over a surface covering undergoing cleaning, and means to position said nozzle at an optimum height above said covering including cooperating relative adjustable means, one of said means being connected to said nozzle and movable upon the vertical movement thereof, a second of said means normally in engagement with said first-mentioned means and being constructed and arranged to disengage said first-mentioned means to allow said nozzle to move into contact with and rest upon a supporting surface and being movable to move said first-mentioned means to raise said nozzle a predetermined distance above said covering, and means including the cleaner handle to actuate said second means.

15. In a suction cleaner, a body having a nozzle, said nozzle including surface contacting lips of an area sufficient to support said nozzle substantially on the top of a surface covering, means to support said body for movement over a surface covering and adapted to sink into that covering under the cleaner weight, cooperating means to raise said nozzle to an optimum height above a surface covering undergoing cleaning from a base position thereon, engageable and disengageable means included in said last-mentioned means constructed and arranged to disengage to drop said nozzle to rest on said covering in said base position under the actuation of an outside force and to re-engage with said nozzle in said base position, and means including the cleaner handle to actuate said disengageable means.

16. In a suction cleaner, a handle, a nozzle, means to support said nozzle upon a surface covering undergoing cleaning, cooperating means to fix the operating position of said nozzle above a surface covering undergoing cleaning including first means operatively connected to said nozzle and movable thereby and including second means normally fixing the position of said first means and said nozzle and being disengageable from said first means to enable said nozzle to support itself upon a surface undergoing cleaning, and being engageable with said first means in its position determined by the nozzle when resting upon the surface covering, said second means being movable to move said first means after becoming engaged therewith to raise said nozzle to an optimum operating position above said surface covering, and means operatively connecting said handle to said second means to move the latter into disengagement upon the movement of said handle to a predetermined position.

17. In a suction cleaner, a handle, a nozzle, means to support said nozzle upon a surface covering undergoing cleaning, cooperating means to fix the operating position of said nozzle above a surface covering undergoing cleaning including first means operatively connected to said nozzle and movable thereby and including second means normally fixing the position of said first means and said nozzle and being disengageable from said first means, means connecting said handle to said second means to displace the latter in certain angular positions of said handle from said first means to release said nozzle to permit it to rest upon a surface covering undergoing cleaning, said second means being movable into re-engagement with said first means in the latter's position as determined by the position of said nozzle, said second means being further movable after re-engagement with said first means to exert a force therethrough to lift said nozzle a predetermined distance above said surface covering.

CHARLES H. TAYLOR.